(12) United States Patent
Ragupathi et al.

(10) Patent No.: US 9,740,401 B2
(45) Date of Patent: Aug. 22, 2017

(54) SYSTEMS AND METHODS FOR PHYSICAL STORAGE RESOURCE MIGRATION DISCOVERY

(71) Applicant: Dell Products L.P., Round Rock, TX (US)

(72) Inventors: Dinesh Kunnathur Ragupathi, Round Rock, TX (US); Syama Poluri, Round Rock, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 14/595,373

(22) Filed: Jan. 13, 2015

(65) Prior Publication Data

US 2016/0203078 A1     Jul. 14, 2016

(51) Int. Cl.
*G06F 12/00*     (2006.01)
*G06F 3/06*     (2006.01)

(52) U.S. Cl.
CPC ...................... *G06F 3/06* (2013.01)

(58) Field of Classification Search
CPC ........................................................ G06F 3/06
See application file for complete search history.

(56) References Cited

U.S. PATENT DOCUMENTS

| | | | | |
|---|---|---|---|---|
| 2008/0082771 A1* | 4/2008 | Pong | ...................... | G06F 9/526 711/163 |
| 2011/0282842 A1* | 11/2011 | Popovski | ............ | G06F 11/1435 707/649 |
| 2015/0227457 A1* | 8/2015 | Gao | ................... | G06F 12/0246 711/103 |

* cited by examiner

*Primary Examiner* — Gurtej Bansal
(74) *Attorney, Agent, or Firm* — Jackson Walker L.L.P.

(57) ABSTRACT

In accordance with embodiments of the present disclosure, a system may include a storage controller for managing virtual storage resources and physical storage resources of one or more information handling systems. The storage controller may be configured to, responsive to removal of a physical storage resource owned by the storage controller from a first information handling system broadcast a request to one or more other information handling systems to determine if the physical storage resource has been relocated to a second information handling system. The storage controller may also be configured to, responsive to receiving a reply from the second information handling system indicating that the physical storage resource has been relocated to the second information handling system, operate in concert with a second storage controller of the second information handling system to use the data of the physical storage resource.

14 Claims, 3 Drawing Sheets

SYSTEMS AND METHODS FOR PHYSICAL STORAGE RESOURCE MIGRATION DISCOVERY

TECHNICAL FIELD

The present disclosure relates in general to information handling systems, and more particularly to discovery of storage resources migrated from one information handling system to another.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual storage resource." Implementations of storage resource arrays can range from a few storage resources disposed in a server chassis, to hundreds of storage resources disposed in one or more separate storage enclosures.

In some storage architectures, such as a Software Defined Storage (SDS) architecture, virtual storage resources may be created using physical storage resources that may be located among disparate servers. For example, a virtual storage resource may utilize storage resources locally or in remote servers. Disk misplacement and movement among servers is a common problem in storage environments. When a storage resource of a virtual storage resource is unexpectedly removed from an array, the virtual resource may run in a degraded state (e.g., without redundancy). A rebuild of lost data to resume to a non-degraded state may take long periods. In addition, in many current systems, when a physical storage resource is installed in a server, such server may immediately overwrite the previous data on the physical storage resource for incorporation into a new storage array.

SUMMARY

In accordance with the teachings of the present disclosure, the disadvantages and problems associated with relocation of physical storage resources may be reduced or eliminated.

In accordance with embodiments of the present disclosure, a system may include a storage controller for managing virtual storage resources and physical storage resources of one or more information handling systems. The storage controller may be configured to, responsive to removal of a physical storage resource owned by the storage controller from a first information handling system broadcast a request to one or more other information handling systems to determine if the physical storage resource has been relocated to a second information handling system. The storage controller may also be configured to, responsive to receiving a reply from the second information handling system indicating that the physical storage resource has been relocated to the second information handling system, operate in concert with a second storage controller of the second information handling system to use the data of the physical storage resource.

In accordance with these and other embodiments of the present disclosure, a method may include, responsive to removal of a physical storage resource owned by a storage controller from a first information handling system broadcasting a request to one or more other information handling systems to determine if the physical storage resource has been relocated to a second information handling system. The method may also include, responsive to receiving a reply from the second information handling system indicating that the physical storage resource has been relocated to the second information handling system, operating in concert with a second storage controller of the second information handling system to use the data of the physical storage resource.

In accordance with these and other embodiments of the present disclosure, a system comprising may include a storage controller for managing virtual storage resources and physical storage resources of one or more information handling systems, the storage controller configured to, responsive to insertion of a physical storage resource into a first information handling system determine whether an unexpired request associated with the physical storage resource has been received from a second information handling system and communicate a reply to the second information handling system responsive to determining that the unexpired request associated with the physical storage resource has been received.

In accordance with these and other embodiments of the present disclosure, a method may include, responsive to insertion of a physical storage resource into a first information handling system determining whether an unexpired request associated with the physical storage resource has been received from a second information handling system and communicating a reply to the second information handling system responsive to determining that the unexpired request associated with the physical storage resource has been received.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
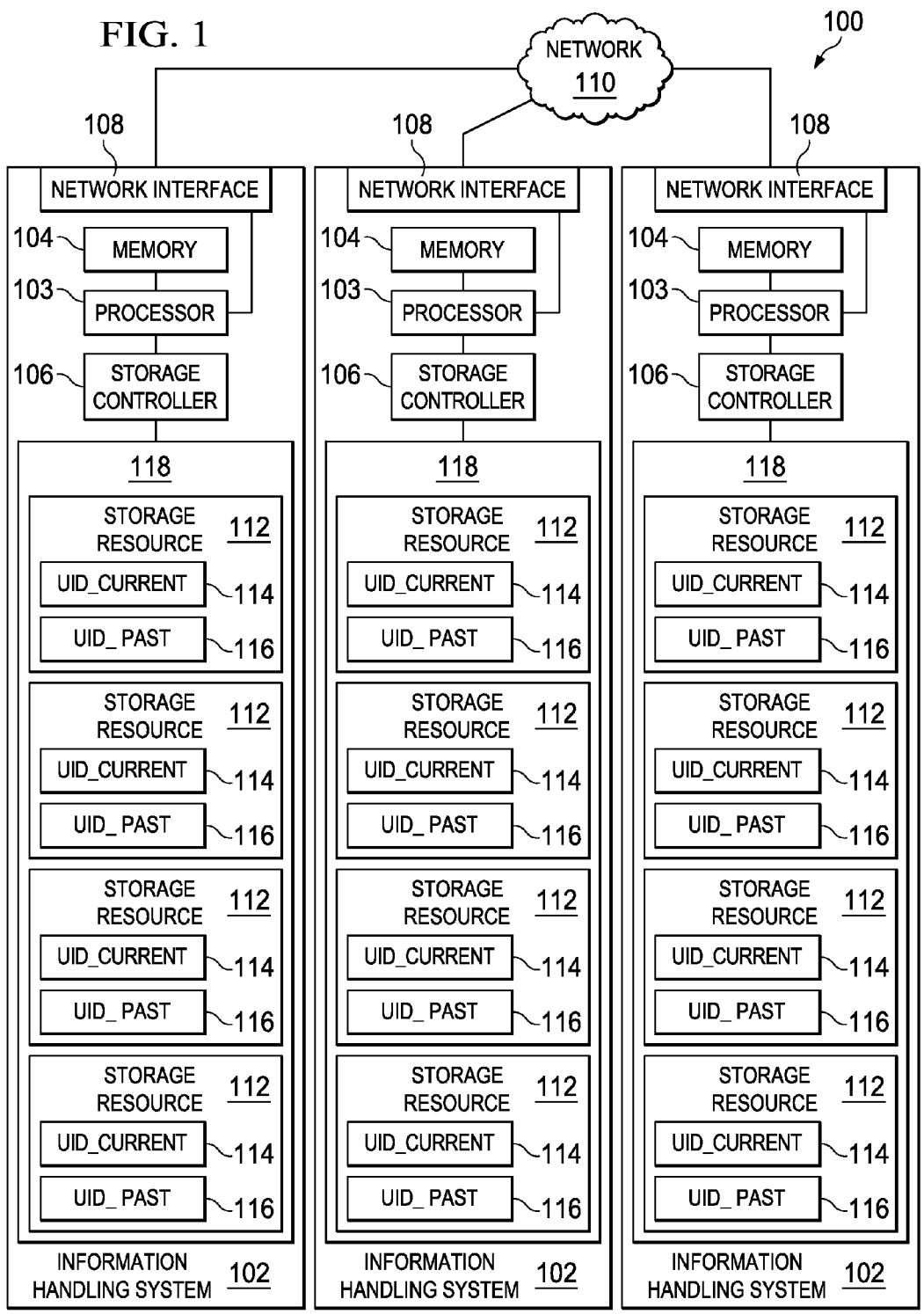
FIG. 1 illustrates a block diagram of an example system for physical storage migration discovery, in accordance with embodiments of the present disclosure.
Figure 2:
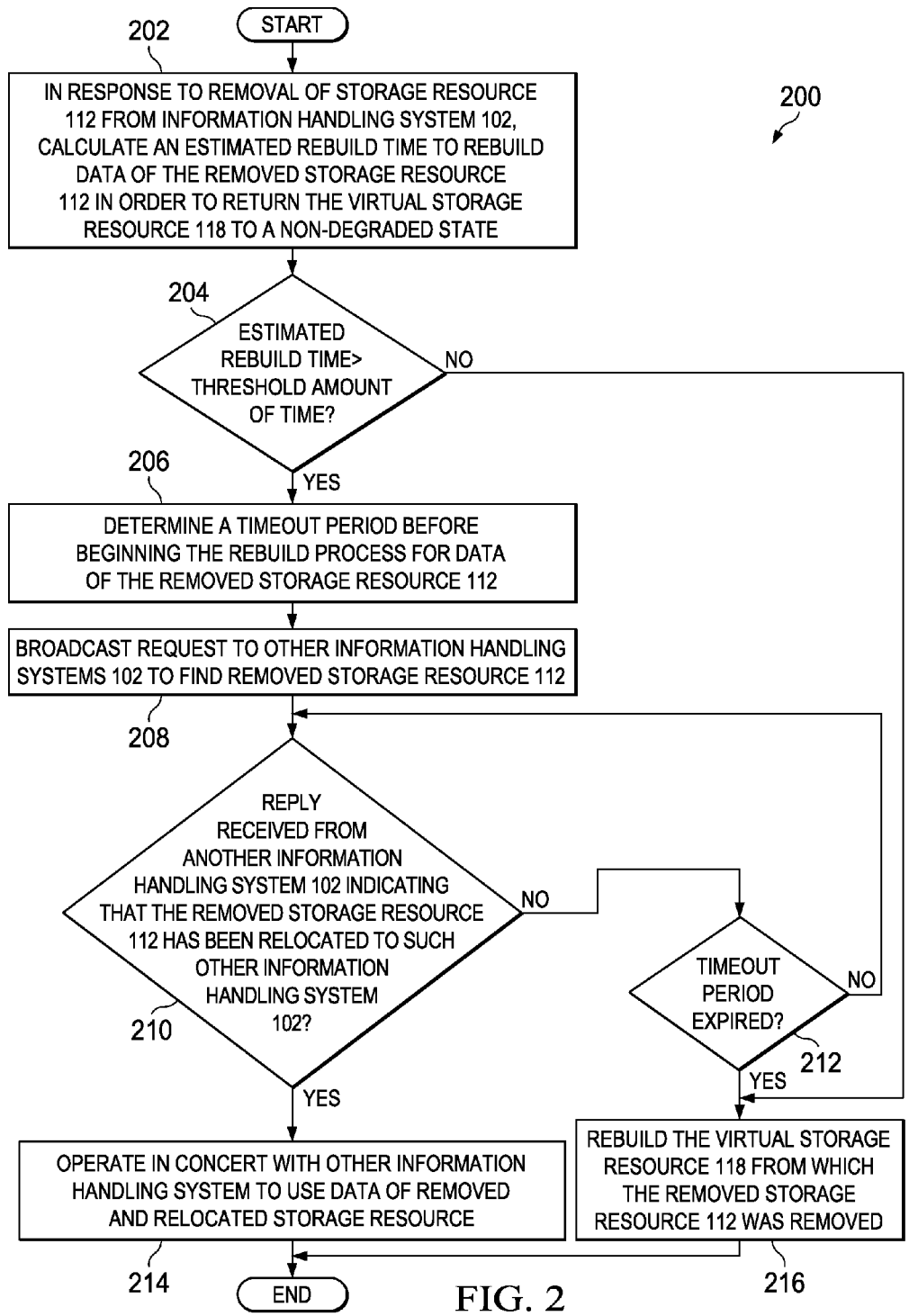
FIG. 2 illustrates a flow chart of an example method for physical storage migration discovery performed in response to removal of a storage resource, in accordance with embodiments of the present disclosure.
Figure 3:
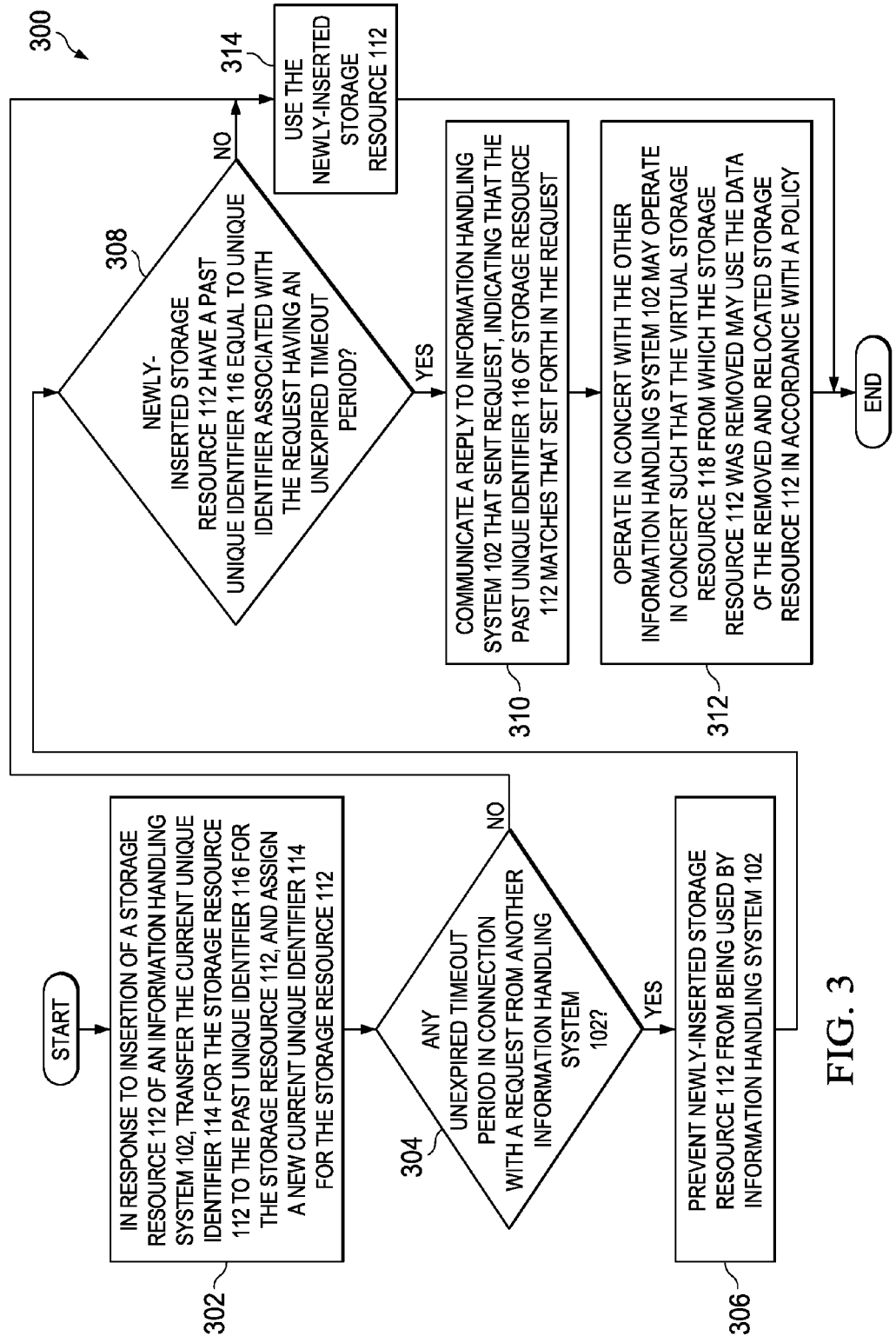
FIG. 3 illustrates a flow chart of an example method for physical storage migration discovery performed in response to insertion of a storage resource, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 for physical storage migration discovery, in accordance with embodiments of the present disclosure. As shown in FIG. 1, system 100 may comprise a plurality of information handling systems 102 coupled to one another via network 110.

In some embodiments, information handling system 102 may comprise a server. In these and other embodiments, information handling system 102 may comprise a personal computer. As depicted in FIG. 1, information handling system 102 may include a processor 103, a memory 104 communicatively coupled to processor 103, a storage controller 106 communicatively coupled to processor 103, a network interface 108 coupled to processor 103, and one or more storage resources 112 communicatively coupled to storage controller 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resources 112, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage controller 106 may be communicatively coupled to processor 103 and may include any system, device, or apparatus configured to serve as an interface between processor 103 and storage resources 112 of an information handling system 102 to facilitate communication of data between processor 103 and storage resources 112 in accordance with any suitable standard or protocol. In addition, storage controller 106 may be configured to manage physical storage resource migration discover operations, as described in greater detail in this disclosure with respect to FIGS. 2 and 3. In some embodiments, storage controller 106 may comprise a RAID controller. Although storage controller 106 is depicted as comprising a component independent of processor 106, in some embodiments, storage controller 106 may be embodied as a program of instructions stored on computer-readable media accessible by and executable on processor 103.

A network interface 108 may include any suitable system, apparatus, or device operable to serve as an interface between an associated information handling system 102 and network 110. Network interface 108 may enable its associated information handling system 102 to communicate with the external network using any suitable transmission protocol (e.g., TCP/IP) and/or standard (e.g., IEEE 802.11, Wi-Fi). In certain embodiments, network interface 108 may include a physical NIC. In the same or alternative embodiments, network interface 108 may be configured to communicate via wireless transmissions. In the same or alternative embodiments, network interface 108 may provide physical access to a networking medium and/or provide a low-level addressing system (e.g., through the use of Media Access Control addresses). In some embodiments, network interface 108 may be implemented as a local area network ("LAN") on motherboard ("LOM") interface. Network interface 108 may comprise one or more suitable network interface cards, including without limitation, mezzanine cards, network daughter cards, etc.

Network 110 may be a network and/or fabric configured to communicatively couple information handling systems to each other. In certain embodiments, network 110 may include a communication infrastructure, which provides physical connections, and a management layer, which organizes the physical connections of information handling systems 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Physical storage resources 112 may be disposed in one or more storage enclosures configured to hold and power storage resources 112. Storage resources 112 may include hard disk drives, magnetic tape libraries, optical disk drives, magneto-optical disk drives, compact disk drives, compact disk arrays, disk array controllers, and/or any other system, apparatus or device operable to store media.

In operation, one or more storage resources 112 may appear to an operating system or virtual machine executing on information handling system 102 as a single logical storage unit or virtual storage resource 118. For example, each such virtual storage resource 118 may comprise a RAID. Thus, in some embodiments, a virtual storage resource 118 may comprise a redundant array of storage resources 112, wherein at least one of the storage resources 112 making up the virtual storage resource 118 enables data redundancy in order to avoid loss of data in the event of failure and/or removal of one of the storage resources making up the virtual storage resource. In the same or alternative embodiments, virtual storage resource 118 may be implemented using a RAID standard.

Although FIG. 1 depicts each virtual storage resource 118 as including four storage resources 112, it is understood that a virtual storage resource 118 may comprise any number of storage resources 112. Also, although FIG. 1 depicts each virtual storage resource 118 having member storage resources 112 all located locally within the same information handling system 102, in some embodiments, member storage resources 112 of a single virtual storage resource 118 may be spread out across multiple information handling systems 102.

As shown in FIG. 1, each storage resource 112 may store metadata including a current unique identifier 114 (UID_CURRENT) and a past unique identifier 116 (UID_PAST). A unique identifier may comprise an alphabetic, numeric, or alphanumeric string uniquely identifying a storage resource 112 from other storage resources 112. For example, a unique identifier may include the name/number of an information handling system 102 or chassis in which it is installed, a name/number of virtual storage resource 118 in which it is a member, and a name/number identifying the storage resource 112 within its virtual storage resource 118. Current unique identifier 114 may comprise the most recent unique identifier for a storage resource 112, while past unique identifier 116 may comprise the second-most recent unique identifier for the storage resource 112.

In addition to processor 103, memory 104, storage controller 106, network interface 108, and storage resources 112, information handling system 102 may include one or more other information handling resources.

FIG. 2 illustrates a flow chart of an example method 200 for physical storage migration discovery performed in response to removal of a storage resource 112, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen.

At step 202, in response to a removal of a storage resource 112 from an information handling system 102, a storage controller 106 controlling the virtual storage resource 118 for which the removed storage resource 112 was a member may calculate an estimated rebuild time to rebuild data of the removed storage resource 112 in order to return the virtual storage resource 118 to a non-degraded state.

At step 204, the storage controller 106 may determine whether the estimated rebuild time is greater than a threshold amount of time, wherein the threshold amount of time may be that deemed significant enough to be worth delaying a rebuild operation in hope of discovering the removed storage resource 112 in another information handling system 102. In some embodiments, the threshold amount of time may be user-configurable. In other embodiments, the threshold amount of time may be automatically configured by a vendor, manufacturer, or other provider of an information handling system 102 or a component thereof. If the estimated rebuild time is less than the threshold amount of time, method 200 may proceed to step 216. Otherwise, if the estimated rebuild time exceeds the threshold amount of time, method 200 may proceed to step 206.

At step 206, the storage controller 106 may determine a timeout period before beginning the rebuild process for data of the removed storage resource 112. In some embodiments, the timeout period may be user-configurable. In these and other embodiments, the timeout period may be a particular fraction or percentage (e.g., 10%) of the estimated rebuild time.

At step 208, the storage controller 106 may broadcast a request to other information handling systems 102, wherein the request may include the timeout period and/or the current unique identifier 114 of the removed storage resource 112 at the time it was removed. As described below with respect to FIG. 3, the request may cause other information handling systems 102 to refrain from using a storage resource 112 having the unique identifier of the removed storage resource or refrain from using any newly-installed storage resource for the timeout period.

At step 210, the storage controller 106 may determine if a reply has been received from another information handling system 102 indicating that the removed storage resource 112 has been relocated to such other information handling system 102. If such a reply is received, method 200 may proceed to step 214. Otherwise, method 200 may proceed to step 212.

At step 212, the storage controller 106 may determine if the timeout period has expired. If the timeout period has expired, method 200 may proceed to step 216. Otherwise, method 200 may proceed again to step 210.

At step 214, in response to receiving a reply indicating that the removed storage resource 112 has been relocated to another information handling system 102, the storage controller 106 and the other information handling system 102 may operate in concert such that the virtual storage resource 118 from which the removed and relocated storage resource 112 was removed may use the data of the removed and relocated storage resource 112 in accordance with a policy. Examples of such policies are discussed in greater detail below. After completion of step 214, method 200 may end.

At step 216, the storage controller 106 may rebuild the virtual storage resource 118 from which the removed storage resource 112 was removed. After completion of step 216, method 200 may end.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof or any other system such as those shown in FIG. 1 operable to implement method 200. In certain embodiments, method 200 may be implemented partially or fully in software and/or firmware embodied in computer-readable media.

FIG. 3 illustrates a flow chart of an example method 300 for physical storage migration discovery performed in response to insertion of a storage resource 112, in accordance with embodiments of the present disclosure. According to certain embodiments, method 300 may begin at step 302. As noted above, teachings of the present disclosure may be implemented in a variety of configurations of system 100 as shown in FIG. 1. As such, the preferred initialization point for method 300 and the order of the steps comprising method 300 may depend on the implementation chosen.

At step 302, in response to insertion of a storage resource 112 into an information handling system 102, a storage controller 106 associated with the information handling system 102 may transfer the current unique identifier 114 for the storage resource 112 to the past unique identifier 116 for the storage resource 112, and then assign a new current unique identifier 114 for the storage resource 112.

At step 304, the storage controller 106 may determine if there exists an unexpired timeout period in connection with a request (e.g., a request such as that made in step 208 of method 200) from another information handling system 102. If no unexpired timeout period exists, method 300 may proceed to step 314. Otherwise, method 300 may proceed to step 306.

At step 306, storage controller 106 may prevent the newly-inserted storage resource 112 from being used by the information handling system 102. At step 308, storage controller 106 may determine if the newly-inserted storage resource 112 has a past unique identifier 116 equal to a unique identifier associated with a request (e.g., a request such as that made in step 208 of method 200) received by the storage controller 106 having an unexpired timeout period. If the newly-inserted storage resource 112 has a past unique identifier 116 equal to a unique identifier associated with a request received by the storage controller 106 having an unexpired timeout period, method 300 may proceed to step 310. Otherwise, method 300 may proceed to step 314.

At step 310, the storage controller 112 may communicate a reply to the information handling system 102 that sent the request, indicating that the past unique identifier 116 of storage resource 112 matches that set forth in the request. At step 312, the storage controller 106 and the other information handling system 102 may operate in concert such that the virtual storage resource 118 from which the storage resource 112 was removed may use the data of the removed and relocated storage resource 112 in accordance with a policy. Examples of such policies are discussed in greater detail below. After completion of step 312, method 300 may end.

At step 314, storage controller 106 may use the newly-inserted storage resource 112. After completion of step 312, method 300 may end.

Although FIG. 3 discloses a particular number of steps to be taken with respect to method 300, it may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof or any other system such as those shown in FIG. 1 operable to implement method 300. In certain embodiments, method 300 may be implemented partially or fully in software and/or firmware embodied in computer-readable media.

As discussed above, when a storage resource 112 removed from one information handling system 102 is discovered as being inserted into another information handling system 102, the storage controllers 106 of the source and recipient information handling systems 102 may act in concert to apply a policy. One policy that may be implemented is a remote ownership policy, in which the storage controller 106 of the source information handling system 102 takes ownership of the relocated storage resource 112 and continues I/O operations with the relocated storage resource 112 as a member of the virtual storage resource 118 from which it was removed. Thus, the virtual storage resource 118 may be returned to a non-degraded state within the timeout duration, thus completely avoiding rebuild.

A second policy that may be implemented is a cloning and release policy, in which the storage controller 106 of the source information handling resource 102 clones the data from the relocated storage resource 112 at the recipient information handling system 102 to a storage resource 112 local to the source information handling system 102, returning a virtual storage resource 118 from which the relocated storage resource 112 was removed to a non-degraded state. After cloning is complete, the storage controller 106 of the source information handling resource 102 may release ownership of the relocated storage resource 112 to the recipient information handling system 102.

A third policy that may be implemented is a release policy, in which the source information handling system 102 may discover the recipient information handling system 102 to which a storage resource 112 is relocated, but then not use the data. At that time, the source information handling system 102 may release the ownership of the relocated storage resource 112 to the recipient information handling system 102. Thus, the recipient information handling system 102 need not wait for the timeout period, thereby saving significant time before starting to use the relocated storage resource 112.

A fourth policy that may be implemented is a release with array migration from the source information handling system 102 to the recipient information handling system 102. Under this policy, the storage controller 106 of the source information handling system 102 may discover member storage resources 112 of a virtual storage resource 118 relocated to a recipient information handling system 102. In such case, the storage controller 106 of the source information handling system 102 may release ownership of the relocated storage resources 112 to the recipient information handling system, and communicate the virtual storage resource 118 configuration to the storage controller 106 of the recipient information handling system 102 so that the recipient information handling system 102 can locally utilize the relocated virtual storage resource.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
    a storage controller for managing virtual storage resources and physical storage resources of one or more information handling systems, the storage controller configured to, responsive to removal of a physical storage resource owned by the storage controller from a first information handling system:
        broadcast a request to one or more other information handling systems to determine if the physical storage resource has been relocated to a second information handling system;
        responsive to receiving a reply from the second information handling system indicating that the physical storage resource has been relocated to the second information handling system, operate in concert with a second storage controller of the second information handling system to use data of the physical storage resource;
        determine a timeout period before beginning a rebuild process for data of the physical storage resource; and
        rebuild the virtual storage resource using a second physical storage resource responsive to expiration of the timeout period before receiving a reply from the second information handling system indicating that the physical storage resource has been relocated to the second information handling system.

2. The system of claim 1, wherein using the data of the physical storage resource comprises the storage controller assuming remote ownership of the physical storage resource and managing the physical storage resource as a member of a virtual storage resource from which the physical storage resource was removed.

3. The system of claim 1, wherein using the data of the physical storage resource comprises the storage controller cloning data of the physical storage resource to a second physical storage resource owned by the storage controller and managing the second physical storage resource as a member of a virtual storage resource from which the physical storage resource was removed.

4. The system of claim 1, wherein the storage controller is configured to, responsive to receiving a reply from the second information handling system indicating that the physical storage resource has been relocated to the second information handling system, release the physical storage resource to the second information handling system.

5. The system of claim 1, wherein the storage controller is configured to, responsive to receiving a reply from the second information handling system indicating that the physical storage resource has been relocated to the second information handling system, communicate configuration information for a virtual storage resource from which the physical storage resource was removed to the second information handling system such that the ownership of the virtual storage resource is transferred to the second information handling system.

6. The system of claim 1, the storage controller further configured to, responsive to removal of the physical storage resource:

calculate an estimated rebuild time to rebuild a virtual storage resource from which the physical storage resource was removed to a non-degraded state;

determine the estimated rebuild time is greater than a threshold amount of time; and broadcast the request responsive to a determination that the estimated rebuild time is greater than the threshold amount of time.

7. The system of claim 6, the storage controller configured to rebuild the virtual storage resource using a second physical storage resource responsive to a determination that the estimated rebuild time is lesser than the threshold amount of time.

8. A method comprising, responsive to removal of a physical storage resource owned by a storage controller from a first information handling system:

broadcasting a request to one or more other information handling systems to determine if the physical storage resource has been relocated to a second information handling system;

responsive to receiving a reply from the second information handling system indicating that the physical storage resource has been relocated to the second information handling system, operating in concert with a second storage controller of the second information handling system to use data of the physical storage resource;

determining a timeout period before beginning a rebuild process for data of the physical storage resource; and rebuilding a virtual storage resource using a second physical storage resource responsive to expiration of the timeout period before receiving a reply from the second information handling system indicating that the physical storage resource has been relocated to the second information handling system.

9. The method of claim 8, wherein using the data of the physical storage resource comprises the storage controller assuming remote ownership of the physical storage resource and managing the physical storage resource as a member of a virtual storage resource from which the physical storage resource was removed.

10. The method of claim 8, wherein using the data of the physical storage resource comprises the storage controller cloning data of the physical storage resource to a second physical storage resource owned by the storage controller and managing the second physical storage resource as a member of a virtual storage resource from which the physical storage resource was removed.

11. The method of claim 8, further comprising, responsive to receiving a reply from the second information handling system indicating that the physical storage resource has been relocated to the second information handling system, releasing the physical storage resource to the second information handling system.

12. The method of claim 11, further comprising, responsive to receiving a reply from the second information handling system indicating that the physical storage resource has been relocated to the second information handling system, communicating configuration information for a virtual storage resource from which the physical storage resource was removed to the second information handling system such that the ownership of the virtual storage resource is transferred to the second information handling system.

13. The method of claim 8, further comprising, responsive to removal of the physical storage resource:

calculating an estimated rebuild time to rebuild a virtual storage resource from which the physical storage resource was removed to a non-degraded state;

determining the estimated rebuild time is greater than a threshold amount of time; and broadcasting the request responsive to a determination that the estimated rebuild time is greater than the threshold amount of time.

14. The method of claim 13, further comprising rebuilding the virtual storage resource using a second physical storage resource responsive to a determination that the estimated rebuild time is lesser than the threshold amount of time.

\* \* \* \* \*